Dec. 10, 1929.  E. S. MOULTON  1,739,370
TIRE
Filed May 5, 1927

Inventor
Edgar S. Moulton
By Mason Fenwick & Lawrence
Attorneys

Patented Dec. 10, 1929

1,739,370

UNITED STATES PATENT OFFICE

EDGAR S. MOULTON, OF ST. JOHNS PARK, FLORIDA

TIRE

Application filed May 5, 1927. Serial No. 189,066.

This invention relates to improvements in tires and rims, particularly in a type of tire having comparatively wide, thick and strong tread members which will function also to resist punctures.

An object of this invention is to provide a tire and rim which will aid in reducing road shock, add long life to the tire, produce easy riding and reduce wear on the car.

A further object of this invention is to provide a tire having an auxiliary pad or shock absorber located toward the outer circumference of the tire and circumferentially of the tire, thereby adding materially to the ease in riding, and providing means for absorbing most of the road shocks.

Another object of this invention is to provide a suitable reinforcing element between the shock absorber and top of the air chamber, having flexibility, but not quite as much as that provided in the uppermost section of the fabric.

A further object of this invention is to provide a tire having an air chamber formed with a wide flat top, thereby adding materially to the easy riding quality of the car. The tire, according to this invention, will also have a double lower portion where it rests on the rim, thereby providing means for easily slipping the tire off and on the rim, requiring no tools or apparent effort. The rim is so formed as to fit any ordinary wheel now used which is provided with bolts and lugs to hold the tire in connection therewith. The tire provides a combination of elements which cannot readily be punctured or suffer a blow-out.

Other objects of this invention will appear from the following detailed description of the device and as disclosed in the single sheet of drawings which is herewith made a part of this application.

In the drawings—

Figure 1:
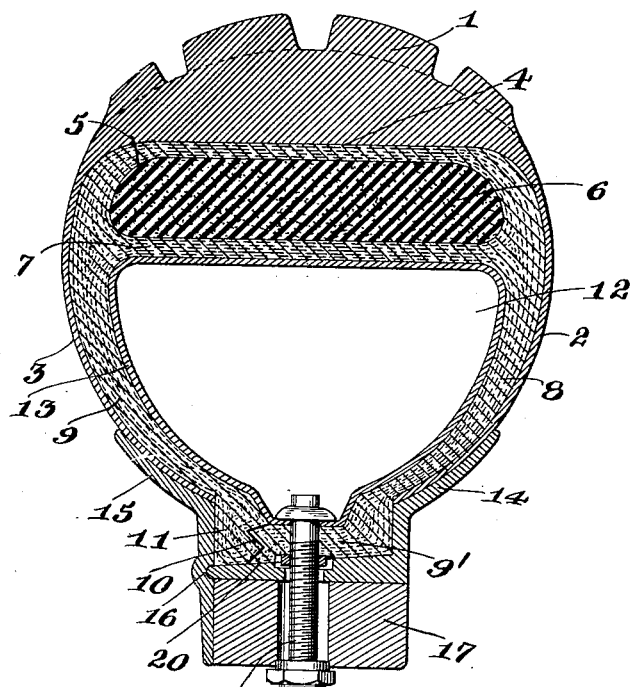
Figure 1 illustrates a vertical cross-sectional view of the rim and tire taken at the valve location.
Figure 2:
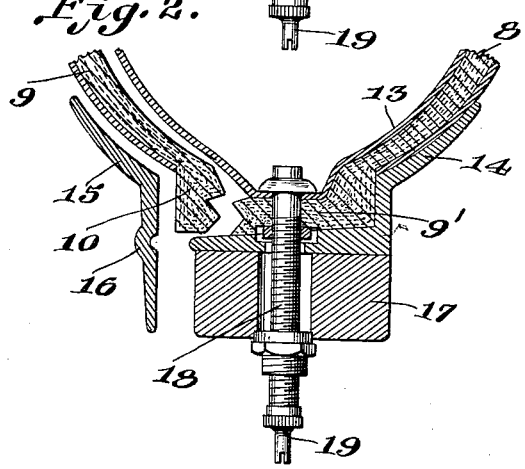
Figure 2 represents a vertical cross-sectional view of a portion of the tire and rim disclosing the elements in released relationship.

Numeral 1 designates a tread member of a tire made of suitable material, such as rubber, and having an extra heavy portion to eliminate possibilities of puncture.

The tread member 1 is provided with the usual side portions 2 and 3 extending integrally therefrom around a substantial portion of the tire. The inner surface 4 of the tread member 1 is formed with a comparatively flat surface 4. Adjacent to the tread member is positioned a flexible fabric lining 5 which is adapted to entirely enclose a spring rubber element 6 which is adapted to absorb most of the road shocks as they are transmitted to the tread member; the portion of the fabric as at 7, located along the inner surface of the spring rubber material 6, is of a thickness and strength considerably in excess of the portion of the fabric along the outer surface of the spring rubber material 6, thus adding materially in strengthening and holding the tire portions together. As a further result of this structure, the portion of the fabric lining 5 next to the tread member 1 is more flexible than the portion 7 of the fabric. The fabric lining is adapted to extend inwardly forming the side walls 8 and 9, one of the side walls, as 8, forming a lip portion 9' having an angular slotted edge as at 10 extending around the inner circumference of the tire and adapted to be brought into cooperative relationship with the slotted lip portion 11 of the side wall 9. Circumferentially of the inner portion of the tire is located an air chamber 12 having a lining 13 of suitable material, such as rubber, adapted to withstand twenty-five to thirty pounds pressure of air, more or less, as may be desired. The rubber lining 13 is preferably cemented to the fabric in an air-tight and secure manner, and the fabric side wall portions 8 and 9 are preferably made extra heavy and strong.

The tire above described is adapted to cooperate in a suitable manner with a tire rim made of ordinary rim material and preferably having two main circumferential elements as at 14, wherein the bottom and one side portion of the rim comprise an integral element, and another element 15 comprises a cooperating side element of the rim. The rim members 14 and 15 are adapted to be brought and held firmly together in the usual manner at a point approximately disclosed at 16. Numeral 17 designates a portion of the wheel adapted to receive the tire and rim.

In order to admit air to the air chamber 12 an ordinary tube valve 18 is provided to extend through the wheel element 17, rim portion 14 and the lip or flap section 9 of the fabric, thence through the rubber lining 13 into the air chamber. The valve is adapted to operate in the usual manner through the valve stem 19 functioning to allow the air to enter the chamber or exhaust therefrom as may be desired.

The rim portions 14 and 15 are so constructed that they will be applicable to any wheel now used which has bolts or suitable fastening elements through the rim of the wheel. The lip portion 9′ and the cooperating connecting element 11 are provided with the zigzag or angularly arranged portions in order that no air may leak therethrough after the tire has been securely located in place by means of the rim and the different interlocking elements. The angular lip portions will function to provide a non-leakable device, while the bottom portions of the flap and lip sections 9′ and 10 are bevelled as at 20 in order that the tire may fit closely and solidly when in position and at the same time make it a simple matter in removing the tire from the wheel on release of the two rim portions.

In operation, this invention provides a tire and rim in which the tire has a flexible thin fabric top portion under the tread, rubber cushioned shock absorber, and fabric portion through the center of the tire which functions, among other objects, to hold it together, thereby making it considerably stronger, and an air chamber requiring no inner tube, thereby providing a construction which cannot be punctured or blown out.

It is to be understood that alterations and substitutions may be made in the above disclosure within the scope of the claims without affecting the merits of the invention.

What I claim is:—

1. A tire comprising a tread member, an interiorly arranged member having more resiliency than the tread member, fabric lining enclosing the interiorly arranged member, the fabric being extended to form an air chamber, a rubber lining for the air chamber, the wearing surface of the tread member being formed having a heavy portion for resisting punctures, the inner surface of the tread portion being formed having a wide flat section, the fabric portion adjacent thereto and the interiorly arranged member together with a contacting fabric portion and section of the rubber lining arranged parallel to the wide flat section thereby providing a tire-wearing surface difficult to puncture.

2. A tire comprising a tread member, an interiorly arranged member having more resiliency than the tread member, fabric lining enclosing the interiorly arranged member, the fabric being extended to form an air chamber, a rubber lining for the air chamber, the wearing surface of the tread member being formed having a heavy portion for resisting punctures, the inner surface of the tread portion being formed having a wide flat section, the fabric portion adjacent thereto and the interiorly arranged member together with a contacting fabric portion and section of the rubber lining arranged parallel to the wide flat section thereby providing a tire-wearing surface difficult to puncture, suitable openings formed in the rubber lining of the fabric for admitting an air valve thereby providing means for supplying air to the chamber or releasing air therefrom.

In testimony whereof I affix my signature.

EDGAR S. MOULTON.